Figure 1:
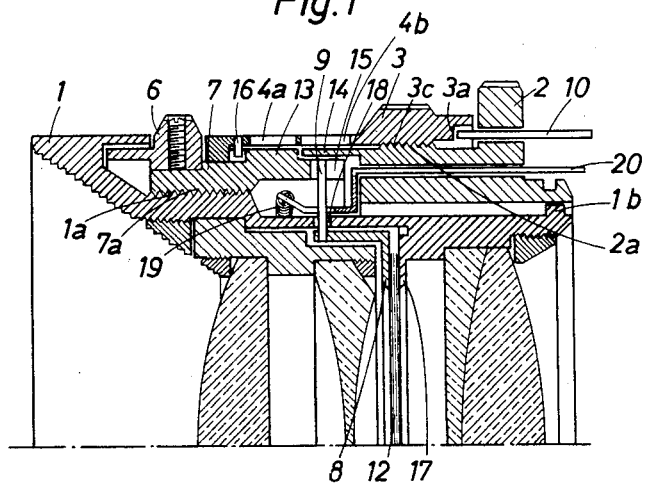

Dec. 26, 1961     W. HOFMANN     3,014,416

DEPTH-OF-FOCUS ADJUSTING MEANS

Filed Oct. 24, 1960

INVENTOR.
WILFRIED HOFMANN
ATTORNEYS

United States Patent Office 3,014,416
Patented Dec. 26, 1961

3,014,416
DEPTH-OF-FOCUS ADJUSTING MEANS
Wilfried Hofmann, Munich, Germany, assignor to Agfa Aktiengesellschaft, Leverkusen-Bayerwerk, Germany, a corporation of Germany
Filed Oct. 24, 1960, Ser. No. 64,613
Claims priority, application Germany Dec. 29, 1959
13 Claims. (Cl. 95—45)

This invention relates to a device for focusing a photographic objective lens, and it more particularly relates to such a device which indicates the range of distances through which it provides a satisfactorily sharp focus at any particular setting.

Heretofore the depth of focus for each setting of a photographic objective lens has been indicated by various auxiliary scales. One such scale is applied alongside the distance indicating symbols inscribed upon the lens tube. Another type of indicator of depth of focus has also been associated with the adjusting element for the diaphragm ring. However, this results in a multiplicity of scales and indicia which confuse photographers, particularly inexperienced amateurs, and they, therefore, cause them to incorrectly set the diaphragm. The operation of these lenses is even more complicated by the fact that the diaphragm at its higher openings controls the illumination of the picture as well as controlling the depth of focus.

An object of this invention is to provide an adjusting device for a photographic objective lens which is easy to set and read.

Another object is to provide such a device which directly indicates the range of distances through which the lens is sharply focused.

In accordance with this invention, two focusing elements are provided. One of these elements focuses the lens with opened diaphragm at a preselected distance. The other focusing element moves the lens in the opposite direction and simultaneously closes the diaphragm. This provides a range of sharp focus for the lens from a near limit established by the first position of the lens to a far limit established by the second position of the lens. A set of indicia associated with the first focusing element indicates the near limit to which the lens is first set, and a differential scale and indicating means cooperatively engaged between the first and second focusing elements provides an indication of the far limit of focus established by the second position at the partial opening to which the diaphragm has been set. This differential second scale and indicating means is, for example, provided by a nut and screw device.

In accordance with another aspect of this invention, the first focusing element may comprise nut and screw means reacting between the tube and the socket provided upon the camera casing. This makes it possible to move or adjust the entire lens tube along its longitudinal axis relative to the camera casing. The other focusing means incorporates additional nut and screw means which reacts between a portion of the tube directly connected to the first focusing element and a portion to which the lens is attached. This second focusing element is also connected to close a diaphragm ring in accordance with its differential movement relative to the first focusing element. Since the second focusing element repositions the lens intermediate the near and far focusing limits which are indicated by the screw thread of the second focusing element, its thread may conveniently use a pitch which is half the pitch of that of the first focusing element to provide a smaller and finer adjustment of the lens for the same movement of the focusing element.

In accordance with another aspect of this invention, the first focusing element incorporates a camming surface for actuating a range finder to indicate the distance at which the lens is focused at open diaphragm. The other focusing element can be connected either directly or indirectly with the time-setting element of the shutter. However, it is also possible to connect the second diaphragm ring either directly or indirectly with this time-setting element. Another convenient arrangement particularly for a fully automatic camera or a single lens reflex camera is one which allows the diaphragm ring to close to its set value only when the shutter is released. This is accomplished, for example, by connecting the diaphragm-closing ring to the shutter by means of a resilient pin and slot coupling.

The primary advantage of this invention is the elimination of the multiplicity of diaphragm indica upon the lens tube which prevents a photographer, particularly an inexperienced amateur, from becoming confused. In this arrangement only the selected near and far limits for the range through which the lens is sharply focused are indicated upon the tube. The proper diaphragm setting for providing this depth of focus is automatically set by the differential scale and indicia means cooperatively engaged between the first and second focusing elements. This arrangement is particularly advantageous for semi- or fully automatic cameras. For semi-automatic cameras, the diaphragm setting which is automatically provided by the selected depth of focus is fixed, and the exposure time interval is set by adjusting a pointer to the exposure indicating device. For fully automatic cameras, the diaphragm closes to the set value after the shutter is released; and the time interval for the shutter is determined by an automatic exposure device in a manner not herein described.

Figure 2:
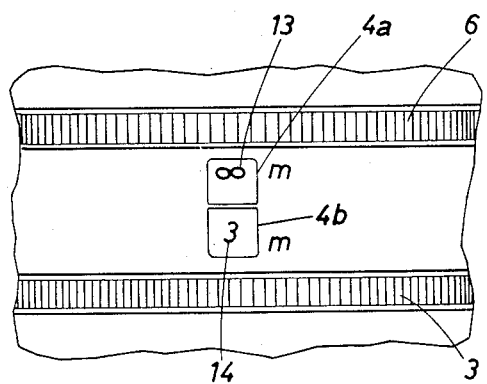

Novel features and advantages of the present invention will become apparent to one skilled in the art from a reading of the following description in conjunction with the accompanying drawings wherein similar reference characters refer to similar parts and in which:

FIG. 1 is the uper half of a cross-sectional view taken through one embodiment of this invention; and FIG. 2 is a plan view of a portion of the embodiment shown in FIG. 1.

This invention coordinates the diaphragm openings within the range of the depth of focus between the near and far limits to which the lens is set. Since the standard diaphragm stops are disposed at equal intervals about the lens tube, the exact distance for which the lens is most sharply focused lies midway between the near and far limits at which the lens focus is sharp enough for all practical purposes. The near and far points of the range of satisfactory sharp focus are respectively set by focusing elements such as knurled rings 3 and 6, which are connected by means of a differential scale and indicating means, for example, incorporating a nut and screw mechanism. These elements accordingly position the lens at an optimum focus which is intermediate the near and far limits of focus to which the first and second focusing elements are set. Only two numbers are visible to the operator. One is the near limit of sharp focus, and the other is the far limit of sharp focus which are adjusted by operation of knurled adjusting rings 3 and 6.

The optical components of the lens are mounted within tube 1 in a manner similar to ordinary lenses. Tube 1 is mounted within a socket 2, which is for example a bayonet socket, in which it is secured against rotation by pin $1d$ engaging a slot. A diaphragm ring 12 incorporating diaphragm-closing rings 8 and 17 is also mounted in tube 1. A diaphragm-adjusting element which is, for example, a pin 9 extends from diaphragm ring 8 through a slot 18 in tube 1. Ring 7 incorporates an internal screw thread $7a$ which is engaged with external screw thread $1a$ upon tube 1. A set of distance-indicating numbers are inscribed upon surface 13 of ring 7. This ring 7 is operated by knurled focusing ring 6 to which it is attached. Ring 7 also includes a slot 15 which engages diaphragm-adjusting pin 9. The other focusing ring 3 incorporates an internal screw thread 3c which is engaged with an external screw thread 2a upon socket 2. Screw thread 1a—7a has a pitch which is double and opposite to that of 2a—3c.

Ring 3 also includes openings 4a and 4b shown in FIG. 2. The aforementioned differential indicating scale 13 of ring 7 is visible through aperture 4a, and an indicating scale 14 is visible upon surface 14 of socket 2 which is visible through aperture 4b. In addition a camming surface 3a is positioned upon the portion of ring 3 adjacent socket 2 and the casing of the camera. A follower pin 10 extends through an aperture in socket 2 and engages camming surface 3a to provide an indication to a range finder of the distance for which the lens is focused. In addition, a stop pin 16 extends from an extended portion of ring 3. Ring 7 also includes a stopping surface which, in cooperation with pin 16, permits adjusting ring 6 to be adjusted only within the range of adjustment of diaphragm 8.

Slot 15 may be widened axially and angularly for automatic and single lens reflex cameras. One side of slot 15 in the reverse focusing direction is accordingly cut away to permit the reverse focusing element, later described in detail, to act only as a limit of travel in the closing direction for diaphragm-adjusting pin 9. A coupling means such as arm 20 accordingly extends through socket 2, and is resiliently urged by spring 9 away from contact with pin 9 to permit the diaphragm to be set to the adjusted value corresponding to the depth of focus only when the shutter is operated. It is also possible to connect the shutter or an exposure meter with adjusting or focusing ring 6 or with rear diaphragm ring 17.

The operation of this device is described by the following specific example of the manner in which it is set in conjunction with a lens having a focal length of 50 mm.

At the outset with diaphragm 8 fully opened and the lens adjusted for an infinity setting, the same infinity indications are displayed through openings 4a and 4b of scales 13 and 14. The lens, is therefore, sharply focused at infinity at its widest diaphragm opening. The adjustment of focusing ring 3, which is designated the first focusing element, therefore, directly focuses the open lens at the distance displayed upon scale 14. This movement is accomplished through screw thread 2a—3c which moves the lens tube 1 and attached element including knurled ring 6 and adjusting ring 7. The indicia upon scale 14 displayed within aperture 4b, therefore, corresponds to the optimum distance for which the lens is focused. Since the diaphragm is fully opened, the depth of focus is quite shallow; and it does not affect the first setting to an appreciable extent. For obtaining the desired depth of focus, knurled ring 6 is turned by the operator far enough to display the desired far limit of focus upon scale 13 in line with aperture 4a. Rotation of ring 6 and attached ring element automatically sets diaphragm adjusting pin 9 to the value corresponding to the desired depth of focus for allowing the far end limits to be satisfactorily sharp. Operation of reverse focusing element 6 accordingly moves the portion of the lens tube engaged with it through screw threads 1a—7a to a distance intermediate the near and far limits of the depth of satisfactory focus, and since the pitch of screw thread 1a—7a is twice that of screw 3c—2a the lens is set midway between the optimum focusing settings for the near and far limits. For example, if it is desired to adjust the lens to be satisfactorily focused between two meters and infinity, the two meter near limit setting is adjusted by operation of first focusing ring 3. A convenient embodiment of this invention utilizes a 30° rotation of ring 3 to provide an axial movement of lens tube 1 of two mm. This positions the two meter setting in aperture 4b upon scale 14. Then reverse focusing ring 6 is moved, for example, in the same direction as knurled ring 3 far enough to position the infinity symbol upon scale 13 within aperture 4a. This also utilizes a turn angle of 30° the same as that of knurled ring 3. However, lens tube 1 is only moved one mm. in an opposite direction to the two mm. movement of the aforementioned setting provided by the 30° turn of knurled ring 3. At the same time diaphragm 8 is adjusted through movement of pin 9 engaged by ring 7 to the stop which provides a satisfactorily sharp focus for the range of distance between two meters to infinity. When, for example, the lens is ultimately set to an optimum focus at a distance of 5 meters, the diaphragm is closed to stop f/16 which corresponds to a satisfactory depth of focus for distances from two meters to infinity.

This invention has the advantages of only displaying the near and far distance limits of the range of satisfactory focus to the photographer. The photographer, therefore, automatically sets the diaphragm to the proper stop with respect to a depth of focus and exposure value without being aware of the complicated relationships which must be taken into consideration.

What is claimed is:

1. An adjusting device for a photographic objective lens mounted within a tube, said tube being inserted within a socket which is rigidly connected to the casing of a camera, a diaphragm mounted within said lens tube, a diaphragm-adjusting element connected to said diaphragm and extending from it, a first focusing element reacting between said tube and said socket means in a manner which sets said lens at a first position which focuses said lens at a preselected distance with said diaphragm open, said first focusing element and said socket means incorporating a first scale and indicating means cooperatively engaged therebetween for providing an indication of said preselected distance, a reverse focusing element which is operatively engaged to react between said socket means and said tube for moving said tube in the opposite direction to the movement provided by said first focusing element to a second position, said reverse focusing element being operatively engaged with said diaphragm-adjusting element in a manner which adjusts it to partially close said diaphragm in accordance with the amount of opposite movement imparted to said lens from said first position by said reverse focusing element, said engagement between said diaphragm-adjusting element and said reverse focusing element being arranged to sufficiently close said diaphragm to provide a satisfactory range of focus for said lens from the near limit established by said first position to a far limit established by said second position, and a differential indicating means cooperatively engaged between said reverse and forward focusing elements for indicating the far limit of focus established by said second position at the partial opening to which said diaphragm has been set.

2. A device as set forth in claim 1 wherein said reverse focusing element is arranged to move said lens in said opposite direction one-half the distance that it has been moved by said first focusing element.

3. A device as set forth in claim 1 wherein said first focusing element comprises nut and screw means reacting between said tube and said socket means.

4. A device as set forth in claim 3 wherein said reverse focusing means comprises nut and screw means reacting between a portion of said tube connected directly to said first focusing element and a portion to which said lens is attached.

5. A device as set forth in claim 4 wherein said socket and tube incorporate interlocking surfaces which engage each other to prevent relative rotation of said socket and tube.

6. A device as set forth in claim 4 wherein the screw thread upon said reverse forcusing element has half the pitch of the screw thread upon said first focusing element.

7. A device as set forth in claim 4 wherein said reverse focusing element is slotted, and a portion of said diaphragm-adjusting element extends through said slot.

8. A device as set forth in claim 7 wherein one side of the slot in said reverse focusing element is open to permit said reverse focusing element to act only as a limit of travel in the closing direction for said diaphragm-adjusting element, and a coupling means extends through said socket into engagement with said diaphragm-adjusting element to permit said diaphragm-adjusting element to be moved to said limit established by said reverse focusing element only when said shutter is operated.

9. A device as set forth in claim 4 wherein said first focusing element comprises a first internally threaded ring incorporating a shoulder which engages a recess within said reverse focusing element, and said reverse focusing element incorporating a second internally threaded ring engaged by an externally threaded portion of said tube for directly transmitting motion imparted by said reverse focusing ring to said tube and indirectly transmitting the movement of said first focusing element to said tube.

10. A device as set forth in claim 9 wherein an extended portion of said first internally threaded ring overlies parts of said socket means and said reverse focusing element, said extended portion being apertured to make said parts visible through it, and indicia being disposed upon said parts to provide said first and said differential scale and indicating means.

11. A device as set forth in claim 1 wherein a limiting means extends from said first focusing element into the path of movement of said reverse focusing element for preventing said reverse focusing element from being moved beyond the range of movement of said diaphragm-adjusting element.

12. A device as set forth in claim 1 wherein one of said focusing elements incorporates a camming surface, a follower element extends through said socket into engagement with said camming surface, and said camming surface being arranged to impart a movement to said follower element for actuating a range finder upon said camera.

13. A device as set forth in claim 12 wherein said camming surface is incorporated upon said first focusing element.

References Cited in the file of this patent
UNITED STATES PATENTS 2,315,977    Mihalyi _____ Apr. 6, 1943